(12) United States Patent
Korn et al.

(10) Patent No.: US 11,607,061 B2
(45) Date of Patent: Mar. 21, 2023

(54) RETRACTABLE PANEL SYSTEM

(71) Applicant: KORN WALL LIMITED, London (GB)

(72) Inventors: Michael Korn, London (GB); Alan Murrell, London (GB); Phil Clarke, London (GB)

(73) Assignee: KORN WALL LIMITED, London (GB)

( * ) Notice: Subject to any disclaimer, the term of this patent is extended or adjusted under 35 U.S.C. 154(b) by 34 days.

(21) Appl. No.: 17/048,287

(22) PCT Filed: Apr. 16, 2019

(86) PCT No.: PCT/EP2019/059840
§ 371 (c)(1),
(2) Date: Oct. 16, 2020

(87) PCT Pub. No.: WO2019/201948
PCT Pub. Date: Oct. 24, 2019

(65) Prior Publication Data
US 2021/0100377 A1 Apr. 8, 2021

(30) Foreign Application Priority Data
Apr. 20, 2018 (GB) .................... 1806508

(51) Int. Cl.
E04C 3/00 (2006.01)
A47G 5/02 (2006.01)
(Continued)

(52) U.S. Cl.
CPC ............. A47G 5/02 (2013.01); E04B 2/7401 (2013.01); E04C 3/005 (2013.01); E06B 9/42 (2013.01); G03B 21/58 (2013.01)

(58) Field of Classification Search
CPC ........... A47G 5/02; E04B 2/7401; E04B 2/74; G03B 21/58; E06B 9/42; G09F 15/0006; E04C 3/005
(Continued)

(56) References Cited

U.S. PATENT DOCUMENTS 4,991,784 A * 2/1991 Schmid .................. B65G 47/82
242/585
5,235,788 A * 8/1993 Maimets .................. B64G 4/00
244/172.6
(Continued)

FOREIGN PATENT DOCUMENTS

CN 1214006 A 4/1999
CN 201148830 Y 11/2008
(Continued)

OTHER PUBLICATIONS rubberflooringinc.com, available from: https://www.rubberflooringinc.com/gym-mat/4-6-13 8-home-cheermat. html [accessed Oct. 17, 2018] See figure.
(Continued)

Primary Examiner — Brent W Herring
(74) Attorney, Agent, or Firm — Olson & Cepuritis, Ltd.

(57) ABSTRACT

A system comprises a retractable panel structure, for example a screen/wall/divider/partition that can be rolled up and that can be unrolled. The panel structure comprises a back face (47) and a front face (48) that are spaced-apart from each other. The front face (48) is at least partly formed of an array of strips (23, 40) that are separate from each other and that move apart to allow the panel structure to be rolled up and wherein the back face (47) forms hinges that connect the strips (23, 40) together and that are capable of flexing to allow the said strips (23, 40) to move apart when the sheet is rolled up.

18 Claims, 20 Drawing Sheets

(51) Int. Cl.
*E04B 2/74* (2006.01)
*E06B 9/42* (2006.01)
*G03B 21/58* (2014.01)

(58) Field of Classification Search
USPC .......................................................... 52/108
See application file for complete search history.

(56) References Cited

U.S. PATENT DOCUMENTS

| | | | |
|---|---|---|---|
| 6,217,975 B1* | 4/2001 | Daton-Lovett | B65G 15/08 |
| | | | 428/36.1 |
| 6,256,938 B1* | 7/2001 | Daton-Lovett | H01Q 1/087 |
| | | | 138/119 |
| 6,463,983 B1* | 10/2002 | Lang | E06B 9/54 |
| | | | 160/273.1 |
| 9,404,256 B2* | 8/2016 | Adams | E04C 3/005 |
| 10,383,463 B2 | 8/2019 | Korn | |
| 2015/0284955 A1* | 10/2015 | Adams | B64G 1/222 |
| | | | 29/428 |
| 2017/0325605 A1 | 11/2017 | Korn | |

FOREIGN PATENT DOCUMENTS

| | | |
|---|---|---|
| CN | 101396871 A | 4/2009 |
| CN | 101432493 A | 5/2009 |
| CN | 107912032 A | 4/2018 |
| DE | 2303283 A1 | 8/1974 |
| EP | 3251562 A2 | 12/2017 |
| GB | 2470196 A | 11/2010 |
| GB | 2482086 A | 1/2012 |
| WO | 93/04619 A1 | 3/1993 |
| WO | 99/62812 A1 | 12/1999 |
| WO | 2012/168741 A1 | 12/2012 |

OTHER PUBLICATIONS

Yanko Design, Feb. 13, 2018, "A wood table you can roll up", yankodesign.com, available from: https://www.yankodesign.com/2018/02/13/a-wood-table-you-can-rollup/ [accessed Oct. 17, 2018] See figures.

Amazon, Jun. 8, 2012, "Bed Slats with an Purple & Black Zebra Print Faux Fur Fabric Roll", amazon.com available from: https://www.amazon.com/dp/B008AOAXIQ?tag=sleeping 1001-20 &ascsubtag=9f2c08dbe0266571fb077a7dee1d4a7c-21).

Rhtubs, Jun. 18, 2016, "Roll Covers", rhtubs.com, available from: http://rhtubs.com/product/roll-covers/ [accessed: Oct. 17, 2018] See figures.

Trade Show Stuff, Mar. 18, 2012, "1 0' × 1 0' Rollable Bamboo Eco-friendly Trade Show Flooring", tradeshowstuff.com, available from: https://estore.tradeshow-stuff.com/Rollable-Bamboo-Trade-Show-Flooring-p/ks-rolbam.htm [accessed Oct. 17, 2018] See figure.

* cited by examiner

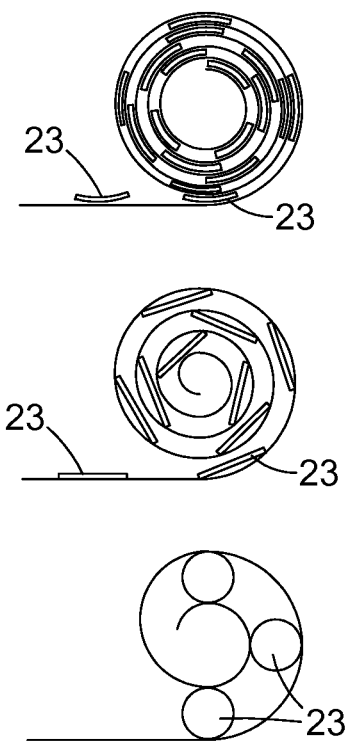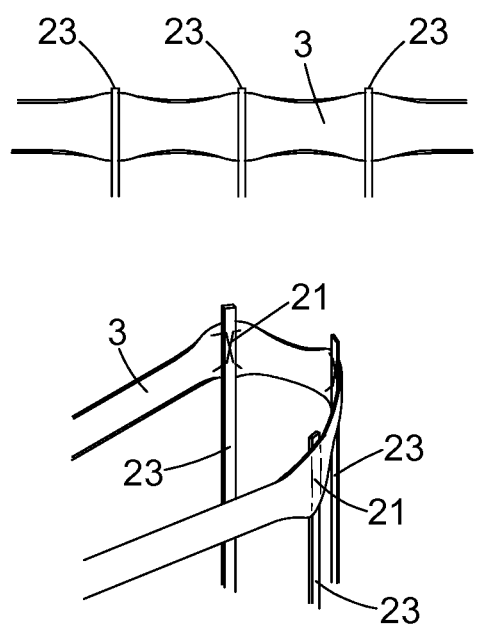
Fig. 6 Fig. 7
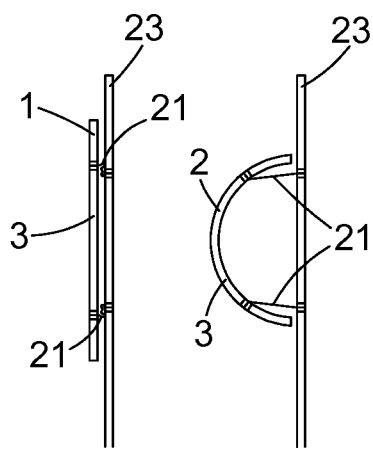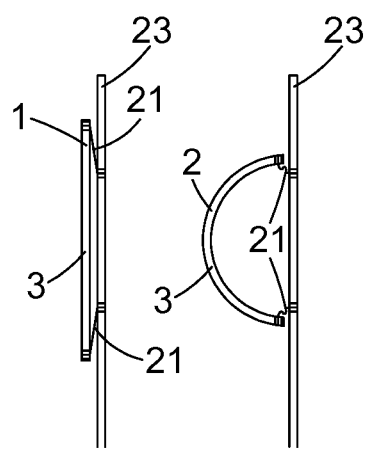
Fig. 8 Fig. 9

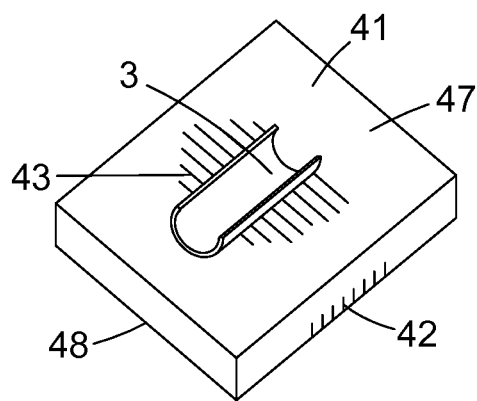
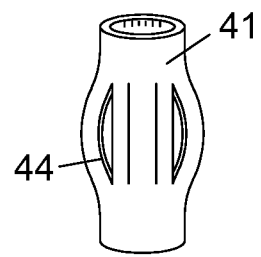
Fig. 21a        Fig. 21b
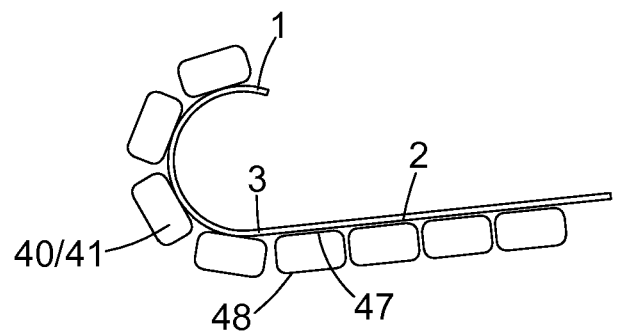
Fig. 22

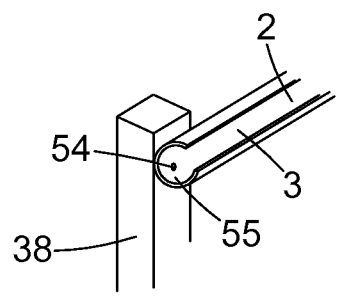
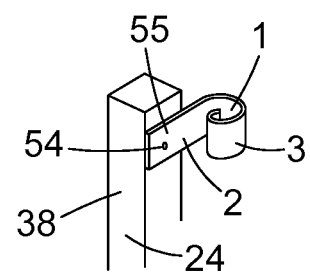
Fig. 25a  Fig. 25b
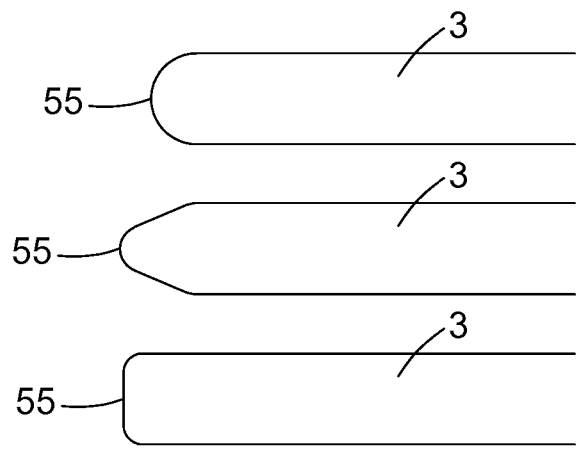
Fig. 26

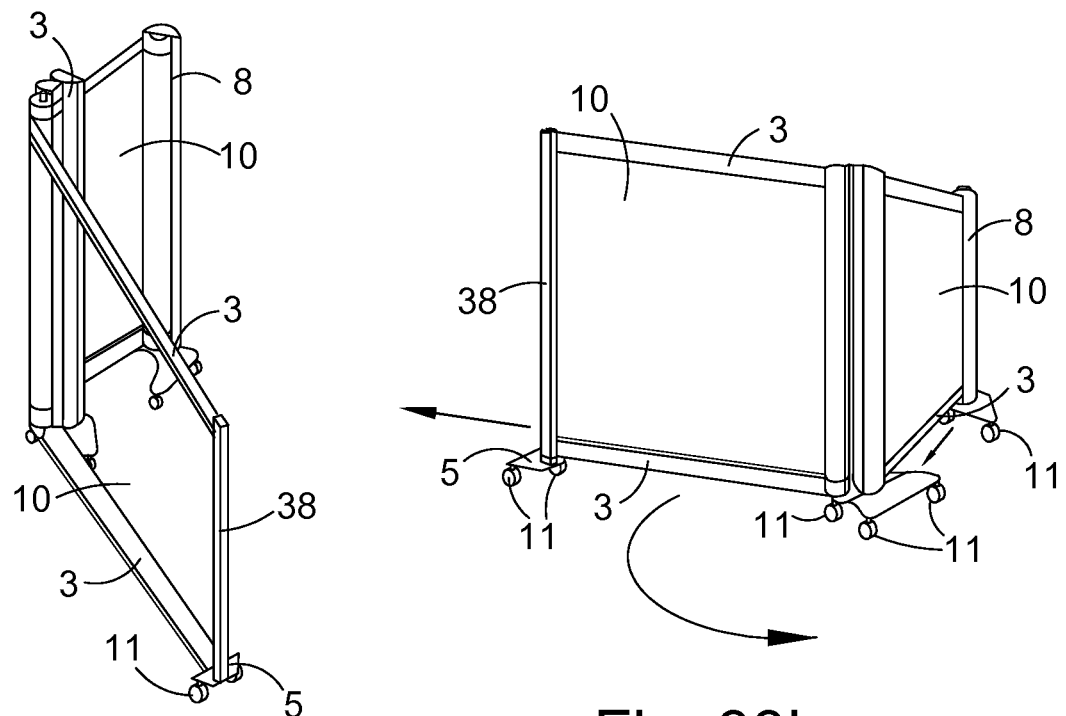
Fig. 33a
Fig. 33b
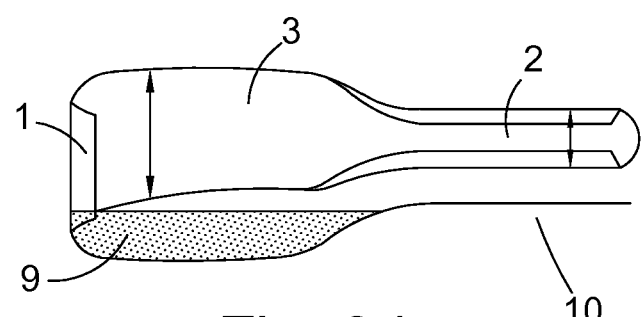
Fig. 34

RETRACTABLE PANEL SYSTEM

CROSS-REFERENCE TO RELATED APPLICATIONS

This application is a U.S. National Stage of PCT/EP2019/059840, filed Apr. 16, 2019, which claims priority to Great Britain Application No. 1806508.6, filed Apr. 20, 2018, each of which is incorporated herein by reference.

The present application relates to retractable structures and especially to a retractable screen/wall/divider/partition which can be extended from a rolled-up state to an extended state and retracted from the extended state into the rolled-up state again. The structure can incorporate one or more split tube extendable members (STEM) to allow it to maintain its extended state while also allowing it to be rolled around itself into a cylindrical shape, e.g. for storage. As well as holding the structure rigid when extended, STEMs can be attached to vertical rods in the structure in such a way as to assist with closing them off, so that the cylindrical structure remains in its coiled orientation. This rod attachment could be used to create a self-closing handle for a screen structure that uses STEMs to create a frame for a screen to be inserted into.

Currently the Bi-stable Reeled Composite (BRC) material technology as described in WO 97/35706 "an extendable member", and WO 88/08620 "an elongate hollow element", is manufactured by Korn Wall Ltd for use in the Kwick-Screen™ product, as per WO 2010/109247 "Screens", EP3251562 "Retractable screen" and US20170325605A1 "Methods for improving straightness in the vertical plane of retractable screen partitions". The BRC technology allows a rigid hollow split tube extendable member (STEM) to roll up on itself to change from a rolled up state (1) to an extended state (2). This is shown in FIG. 1.

EP3251562 discloses a rollable screen supported on a frame, the top and bottom of which are formed of STEMs; one side of the frame is formed by a housing and the other side by an elongated vertical handle. The screen can be retracted by rolling it and the STEMs up within the housing. In one embodiment, in order to improve the straightness of the screen which is typically made of a stiff polymer such as polyester, a small number of thin rigid rods that are widely spaced apart are connected to the inside face of the screen to keep the STEMs parallel. EP3251562 states that these rods should not be attached to the STEMs since they would then interfere with the rolling up of the STEMs. EP3251562 also shows the benefits of having clamps attached to STEMS to enable a handle to be incorporated into the design of a screen. These clamps are all shown to fix the orientation of the STEM as either being coiled or flat. Historically, fixed clamps have been used which either hold the STEM in a 'C' shape which prevents the STEM from fully coiling, or held in a fixed flat-open state which assists the STEM in forced closing but results in a complex shape for an inner screen to be inserted into which creates the risk of the inner screen deforming and wrinkling or creasing. Ideally the frame for the inner screen would be consistent and rectangular in shape.

Other known arrangements include those described in: EP1594384, US2007193705, U.S. Pat. Nos. 5,819,835, 5,875,597, and DE202011109665.

There is a growing demand for flexibility in open plan offices and learning environments in order to create spaces for concentrated working or meetings or exhibiting banners. Many of the known portable walls, some of which have been described above, are either bulky and heavy, thin and flimsy, or are complicated making them expensive, unattractive or impractical to be used and deployed quickly and/or frequently.

The present disclosure seeks to address or at least ameliorate the problems associated with the prior art.

The present disclosure seeks to provide a portable wall, for example one with acoustic properties, that is easy to install and dismantle and is flexible and easy to store. This can be useful in many such environments, especially if it were to be intuitive and easy to be used by the inhabitants of the space, e.g. students in a common room, workers in an open plan office building, salespeople at an exhibition booth.

With the rise of social media and ability for the public to live stream footage of what they can video in their smart phone, the present disclosure can also seek to provide a portable privacy structure, screen/wall/divider/partition that can be can used outdoors by emergency services for shielding patients during incidents in view of the public e.g. a seriously injured football player in view of fans. Deployable walls of the type described may also be used in public gatherings for example to delineate space for paramedics to work without being trampled by crowds, e.g. if someone collapses during a busy street festival or during a marathon on a busy route. The same or a similar arrangement when printed, would be beneficial for example for use at indoor or outdoor exhibitions.

The disclosure describes attaching materials to the central region of the convex side of the STEM in such a way as to not inhibit the STEM from rolling or unrolling and use the structural/functional benefits that comes from the transition in state.

The present application also describes new methods of attaching a handle to a STEM to sufficiently hold the two together and in such a way as to allow the STEM the freedom to change from a curved to a flat state, which introduces a beneficial forced ('snap') closing feature when the handle is fully retracted towards the structure and also creates a neat rectangular frame for an inner screen to be inserted.

Also disclosed is a variety of new structures of which FIG. 17 is just one example, which is made (the reference numerals provided for clarity but not limiting the disclosure in any way) from a solid board material 41 which is partially cut, so that the front face 48 is cut and the core section is partially cut so that the back face 47 becomes a hinge about which the board material can become rollable. Ideally this structure is supported by STEMs 3 along their central region to both provide rigidity when extended and also support it in a cylindrical shape when retracted.

According to a first aspect of the disclosure, there is provided a system comprising a retractable panel structure, for example a screen/wall/divider/partition that can be rolled up and that can be unrolled, wherein the planar structure comprises a back face and a front face that are spaced-apart from each other and wherein the front face is at least partly formed of an array of strips that are separate from each other and that move apart to allow the panel structure to be rolled up and wherein the back face forms hinges that connect the strips together and that are capable of flexing to allow the said strips to move apart when the sheet is rolled up.

Optionally, when the sheet is unrolled, the strips of each pair of adjacent strips abut against each other or are separated by a space that is less than or equal to twice the width of the wider of the strips.

Optionally, when the sheet is unrolled, adjacent strips abut against each other or are separated by a space that is less than or equal to the width of the wider of the pair of adjacent strips.

Optionally, the structure is formed of a front face sheet and a back face sheet and cells or a less dense material spacing the face sheets apart.

Optionally, the strips are formed by scoring or severing or routing the front face.

Optionally, the structure has a thickness of 0.1 to 25 mm, e.g. 1 to 15 mm, such as 3 to 10 mm.

Optionally, the strips each have a width of 0.5 to 100 mm, e.g. 1 to 50 mm, such as 2 to 5 mm or 10 to 40 mm.

Optionally, the space between each pair of adjacent strips is generally less than or equal to 100 mm, e.g. less than or equal to 50 mm such as less than or equal to 10 mm.

Optionally, the system includes a support that is configured to support the structure in its unrolled configuration.

Optionally, the support comprises at least one STEM that is capable of being extended along an axis by uncoiling the STEM and of being retracted back along the same axis by coiling the STEM, and wherein the structure is supported on the at least one STEM by an attachment that causes the structure to be rolled-up and unrolled as the at least one STEM is coiled and uncoiled.

Optionally, the at least one STEM is located adjacent to the back face of the structure. and optionally is attached to the back face.

Optionally, the at least one STEM is located adjacent to a region of the back face of the structure and wherein the back face includes slits in the said region that are in line with the separation between the strips in the front face to allow the back face to expand in the said region when the STEM and the structure are coiled together while at least one other region of the structure forms the said hinges about which the strips can flex when the STEM and the structure are coiled together.

Optionally, the at least one STEM, when extended, has a concave side and a convex side and wherein the structure is attached to the central region of the convex side of the STEM, e.g. to the central axis of the STEM or to the region adjacent to the central axis, for example by adhesive, welding, stitches, rivets, eyelets or by a breakable attachment such as a hook-and-loop connection.

Optionally, the support comprises at least two STEMs that are spaced apart from each other and are extendible along parallel axes and wherein the structure is supported by said at least two STEMs.

Optionally, the STEM is configured to be uncoiled horizontally, upwards or downwards, including obliquely upwards or downwards or curved inwards or outwards.

Optionally, the support includes a housing supporting the at least one STEM, a rotatable spool within the housing and wherein the structure can be rolled up on the spool.

Optionally, the spool includes a bottom plate that is configured to support the structure when wound on the spool.

Optionally, the system includes a spring acting on the spool to assist in the rolling up of the structure.

Optionally, the support includes a handle supporting an end of the at least one STEM remote from the housing.

Optionally, the front face includes a recess in the area in which the which the STEM lies, whereby the back face is stretched outwards and the front face is squashed inwards as the STEM coils up.

Optionally, the support comprises at least two posts attached to the structure and extending parallel to the strips, whereby the posts can be rolled up with the structure.

Optionally, the support includes at least one STEM that is attached to said posts Optionally, the system includes at least one fastening to hold the structure in its rolled-up configuration, such fastenings can be for example hook and loop (Velcro), poppers or magnetic fasteners.

Optionally, the system is in the form of a temporary or permanent indoor or outdoor screen, a room divider, a door, such as a drop down door (e.g. a garage door), a window awning, a curtain or blind, a sound baffling screen, a portable partition screen, a screen in an MRI scanning room when the whole system is non-ferrous, and can optionally function as a whiteboard, a blackboard, a projection surface, a pin board and/or hook and loop board, a poster, a mirror, a solar array, a mirrored film surface, a satellite dish, a decorative panel, a photovoltaic solar array, a flexible television or monitor, e.g. an OLED TV, or an LED light or as the support structure to which other materials can be attached, e.g. to provide the above functionalities.

According to a second aspect of the disclosure, there is provided a Split Tube Extendable Member (STEM) system comprising at least one coilable STEM that has a central axis and that is capable of being extended along an axis by uncoiling the STEM and of being retracted back along the same axis by coiling the STEM, wherein the STEM has an end that forms the leading end of the STEM when it is uncoiled, and wherein the STEM, when extended/uncoiled, has a concave side and a convex side; and a handle that is attached to the convex side of the leading end of the at least one STEM by one or more connections, whereby the coiling action of the leading end of the STEM when retracted biasses the handle towards the rest of the coiled STEM.

Optionally, the handle engages the ground when the at least one coilable STEM has been extended and thereby supports the leading end of the STEM.

Optionally, the handle is supported on at least one castor or glider foot.

Optionally, connections attaching the handle to the convex side of the leading end of the at least one STEM lie on or adjacent to the central axis of the STEM.

Optionally, the leading end of the at least one coilable STEM is clamped flat against the handle.

Optionally, the STEM, when extended has a width of 50 mm to 100 mm, preferably 65-85 mm, more preferably about 75 mm, and subtends arc of between 100 and 180 degrees, preferably about 130 degrees.

Optionally, the system includes a housing for holding the coiled portion of the at least one coilable STEM.

Optionally, the housing engages the ground, and optionally includes at least one castor or gliding feet.

Optionally, the system includes a screen attached to the at least one STEM by an attachment that allows the at least one STEM and the screen to be coiled and uncoiled together.

Optionally, the system comprises at least two STEMs that are spaced apart from each other and are extendible along parallel axes and wherein the screen is supported along opposed edges by said at least two STEMs.

Optionally, the handle, the at least two STEMs and the housing forms a rectangular frame supporting the screen.

Optionally, the at least one STEM is mounted on a spool.

Optionally, spool is biased by a spring that is configured to assist in the retraction of the screen.

Optionally, the leading end of the at least one STEM is attached directly to the handle at a single point, e.g. by adhesive or a mechanical fixing, for example by stitching, welding, adhesive, a rivet or an eyelet, optionally in combination with a bolt.

Optionally, the leading end of the at least one STEM is curved or angled/chamfered in shape (i.e. the end of the STEM is not orthogonal to the STEM central axis).

Optionally, the system includes a clamp that clamps the at least one STEM part of the way along its length and prevents the STEM from forming said concave and convex sides in the region of the clamp, which causes the STEM to kink in the region of the clamp.

Optionally, the system is in the form of a temporary or permanent indoor or outdoor screen, a room divider, an exhibition screen, a safety screen for lasers or x-rays or welding, a door, such as a drop down door (e.g. a garage door), a window awning, a curtain or blind, a sound baffling screen, a portable partition screen, a screen in an MRI scanning room when the whole system is non-ferrous, and can optionally function as a whiteboard, a blackboard, a projection surface, a pin board and/or hook and loop board, a poster, a mirror, a solar array, a mirrored film surface, a satellite dish, a decorative panel, a photovoltaic solar array, a flexible television or monitor, e.g. an OLED TV, or an LED light or as the support structure to which other materials can be attached, e.g. to provide the above functionalities.

Optionally, the at least one STEM is configured to be uncoiled horizontally, upwards or downwards, including obliquely upwards or downwards or curved inwards or curved backwards.

Features from one or more aspects or any optional feature thereof may be combined together.

The present disclosure may be carried out in various ways and embodiments of the disclosure will now be described by way of example with reference to the accompanying drawings, in which.

Figure 1:
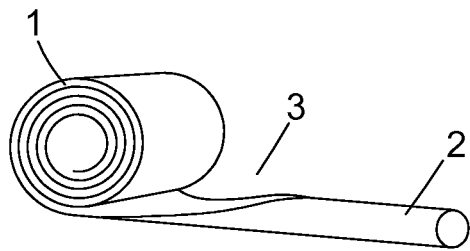
FIG. 1 shows a basic split tube extendable member
Figure 2:
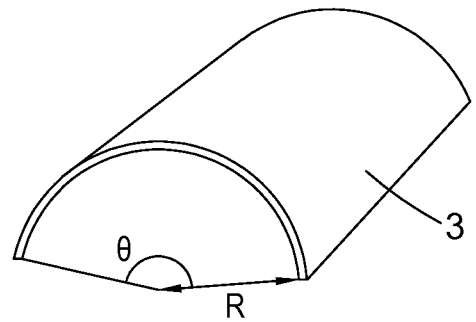
FIG. 2 shows an isometric diagram of a split tube extendable member
Figure 3:
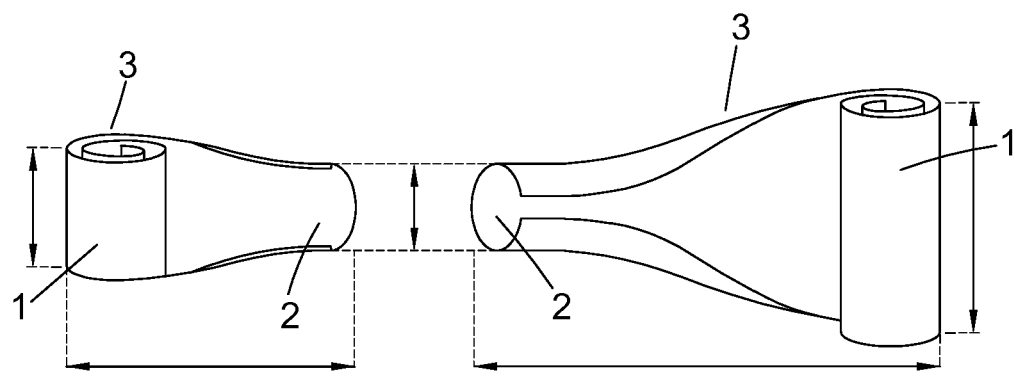
Figure 4:
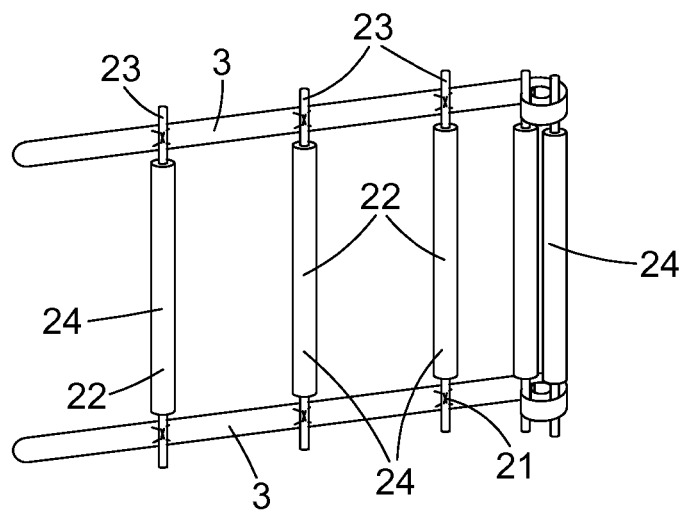
Figure 5:
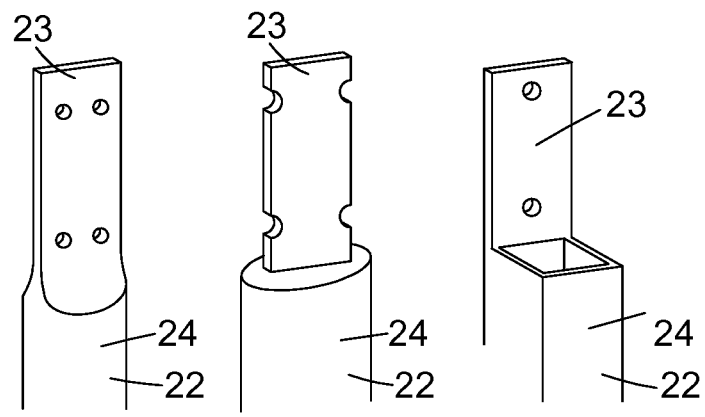

FIG. 3 illustrates differences in transformation between split tubes with arcs over and under 180 degrees FIG. 4 shows a basic frame of two tubes and some poles FIG. 5 shows different designs of low profile ends with different design of holes FIG. 6 shows the impact of different designs of slats on the rolled up STEM—curved rectangle, rectangle and circle FIG. 7 shows how varying the attachments of sticks to tubes can create angled profiles (2-dimensional and isometric views)

FIGS. 8 and 9 explains the positioning of the holes in the tube and flat stick

Figure 10:
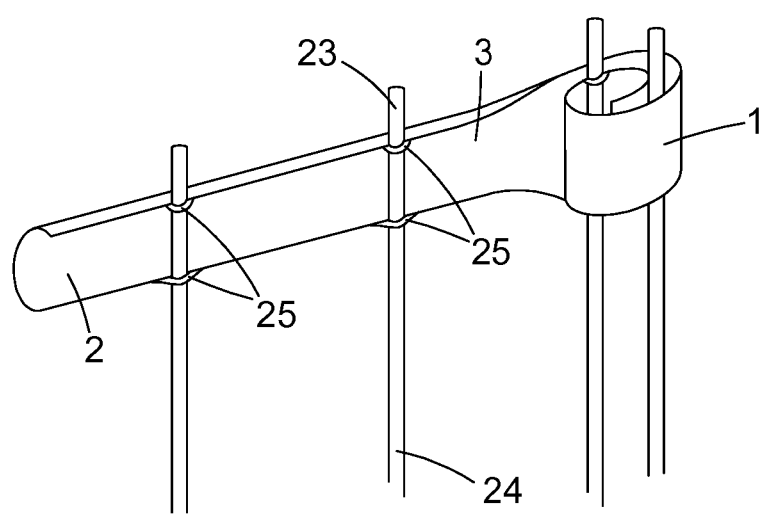

FIG. 10 shows button loops on the edge of a STEM

Figure 11:
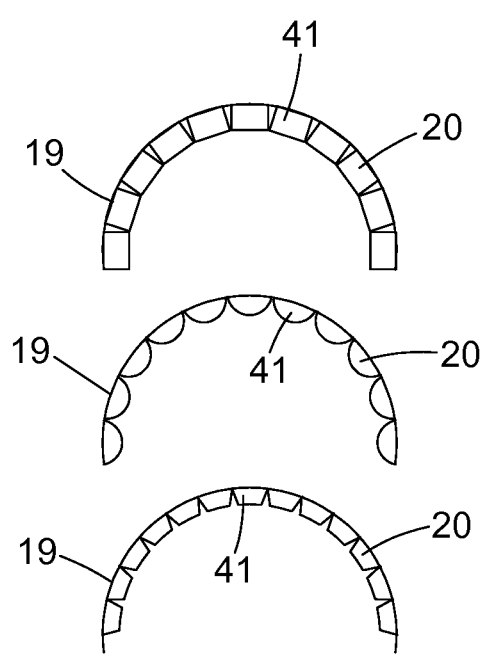

FIG. 11 shows possible different shapes of the rigid backing material

Figure 12:
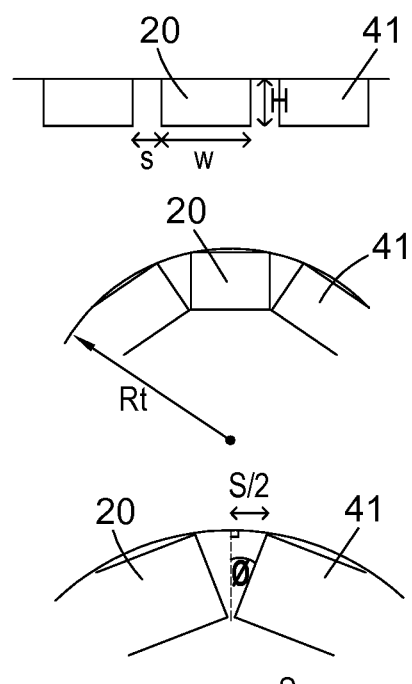
Figure 13:
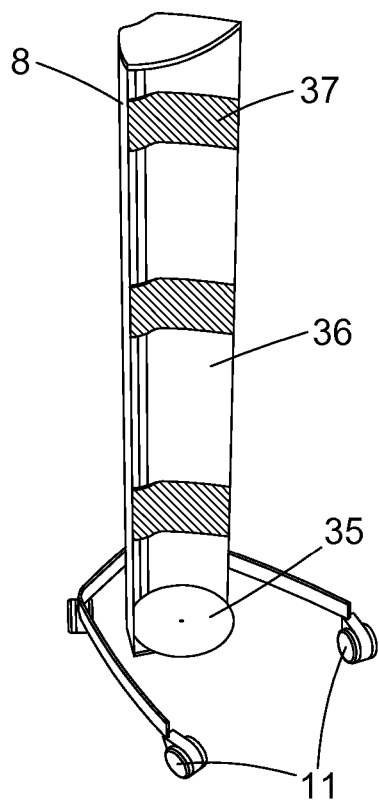
Figure 14:
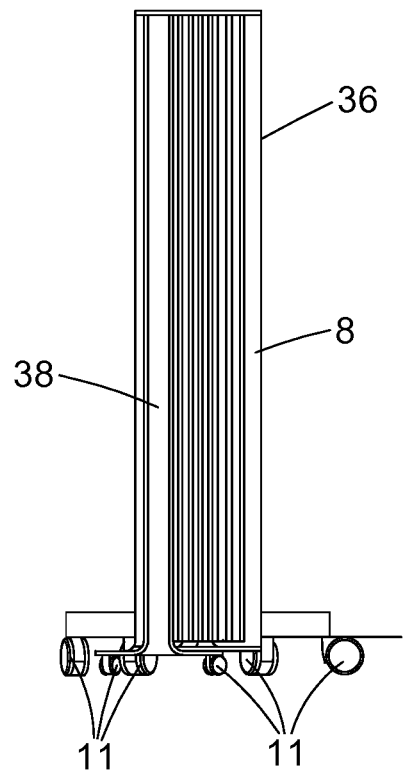
Figure 15:
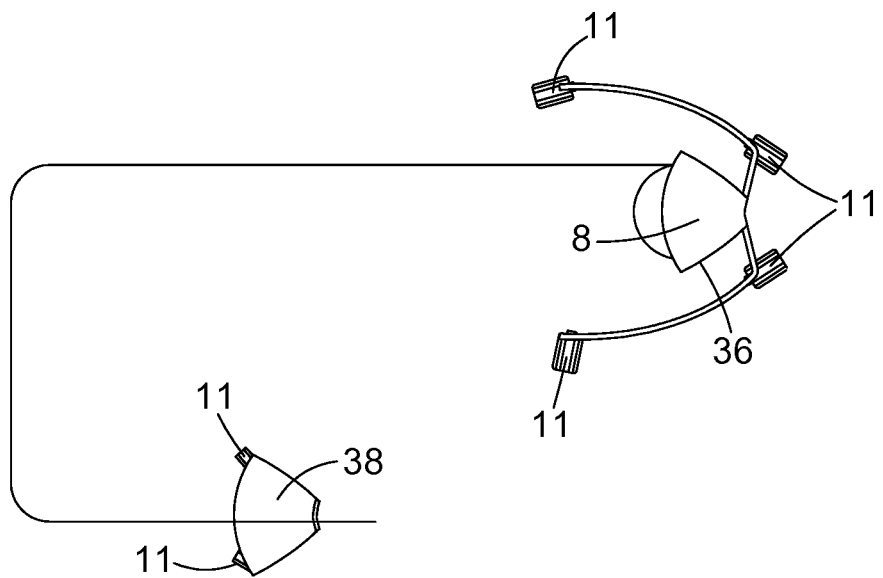
Figure 16:
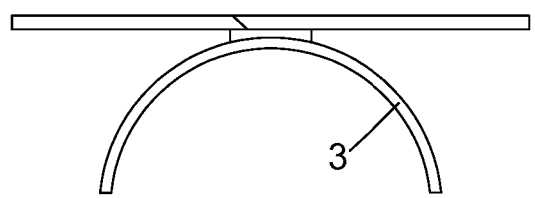
Figure 17:
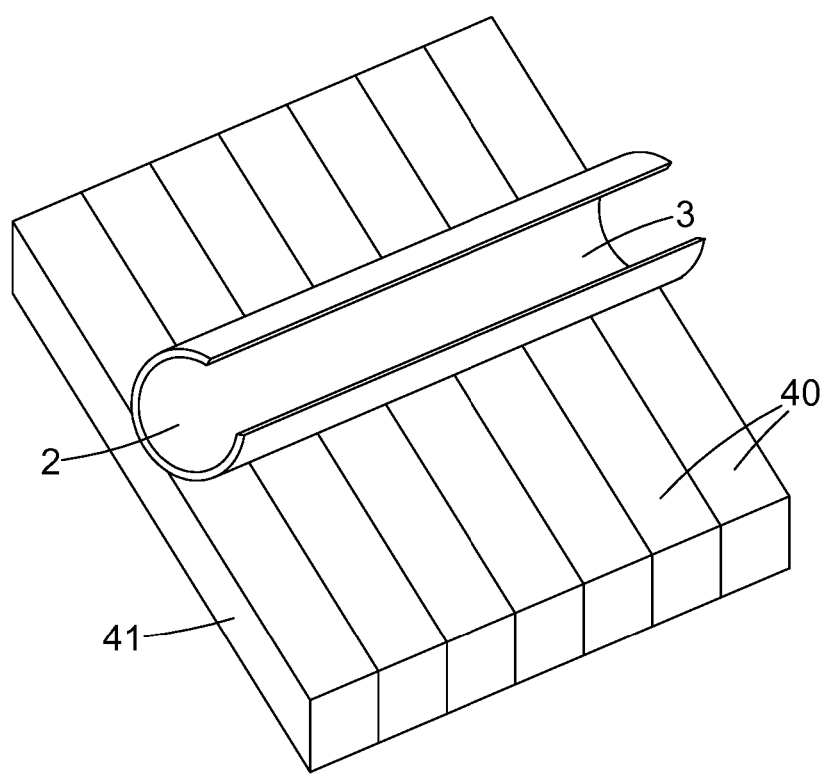
Figure 18A:
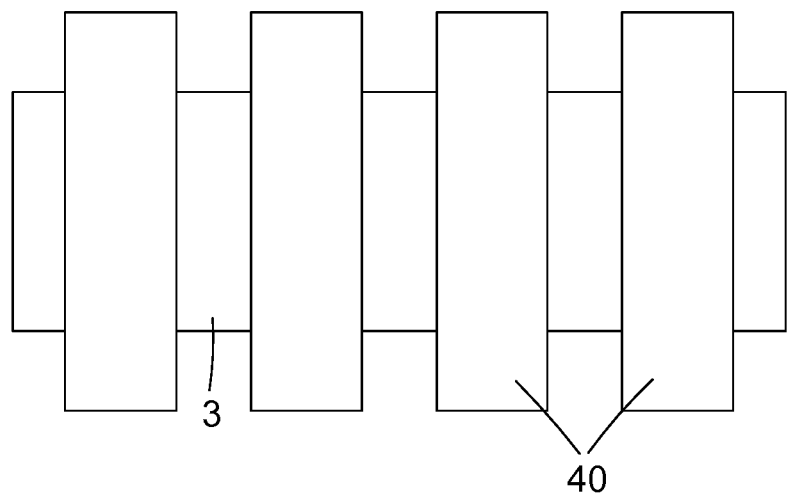
Figure 18B:
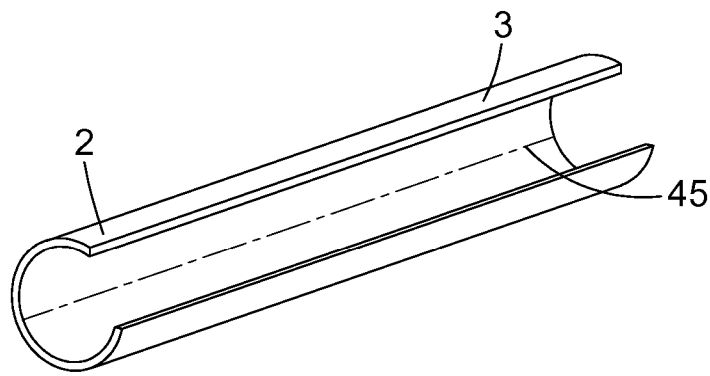
Figure 18C:
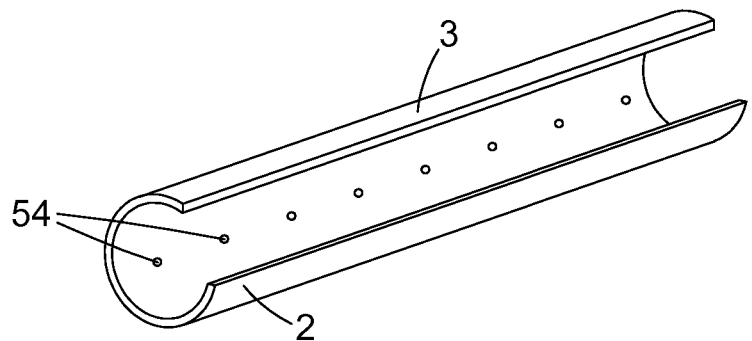
Figure 19:
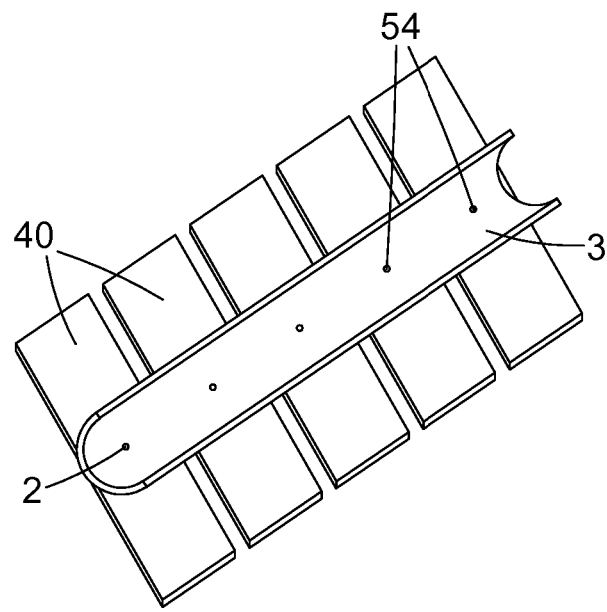
Figure 20:
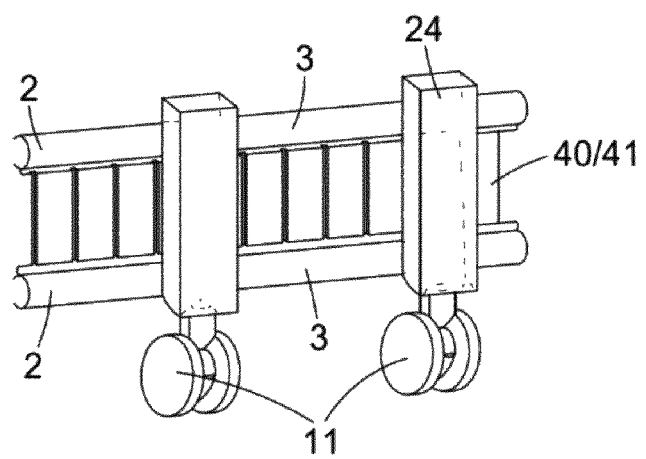
Figure 23:
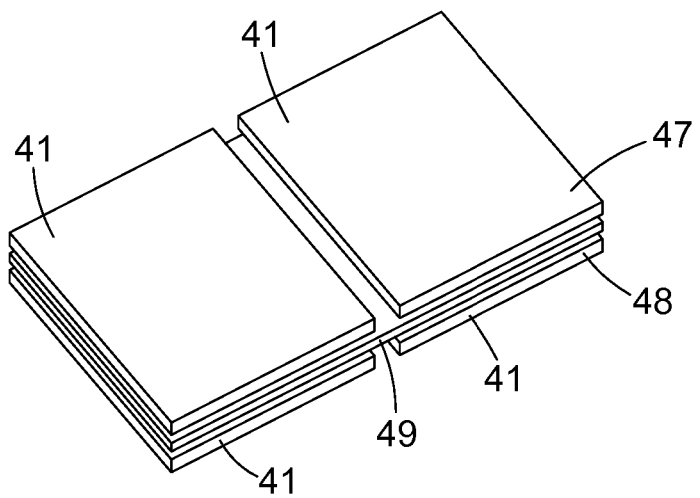
Figure 27:
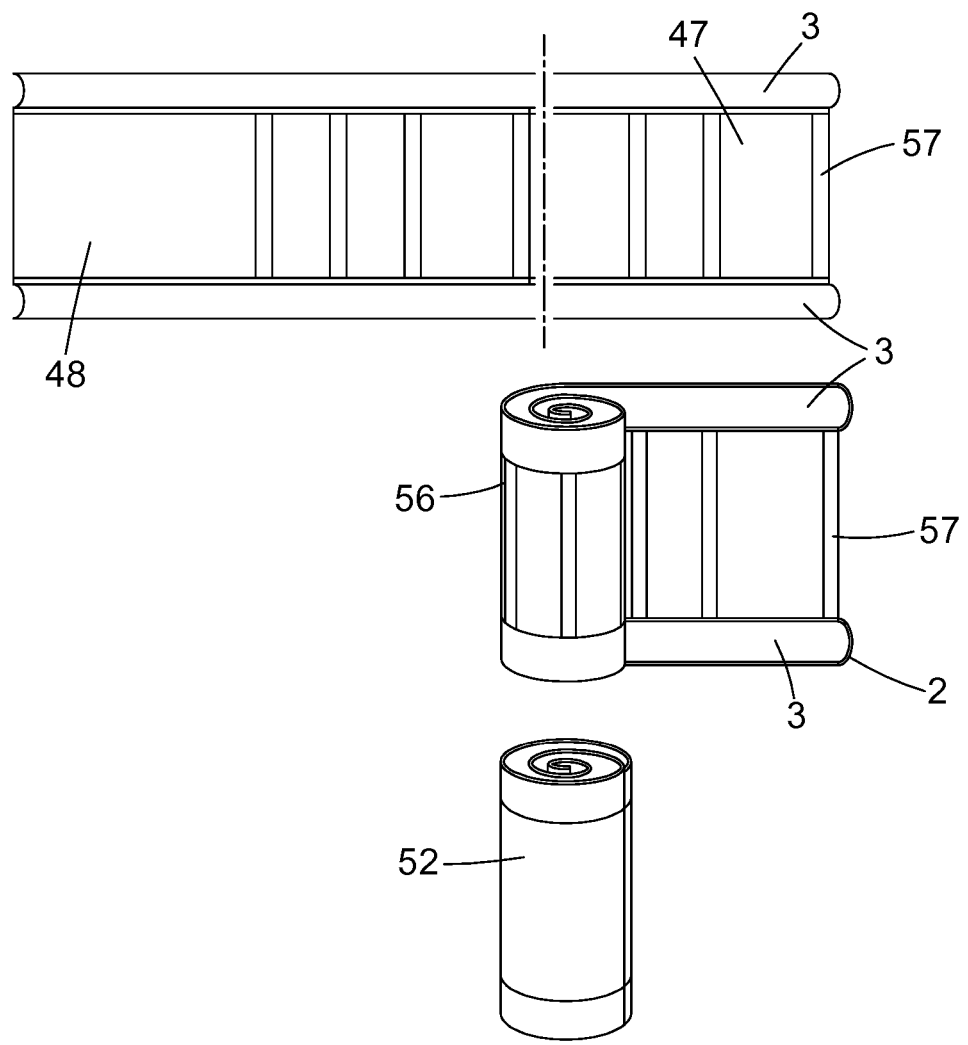
Figure 28A:
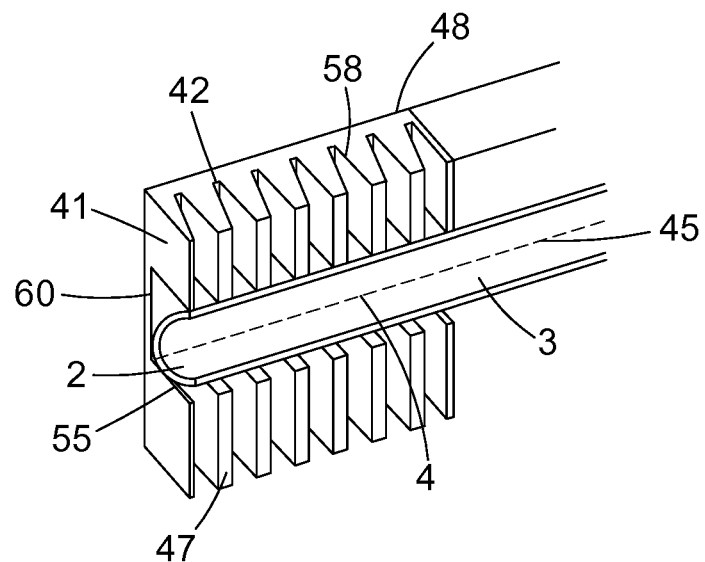
Figure 28B:
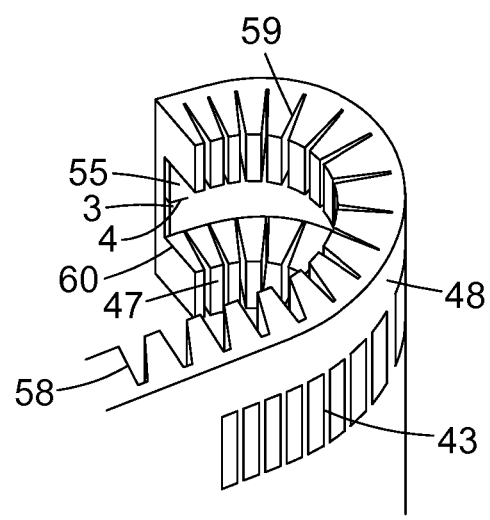
Figure 29:
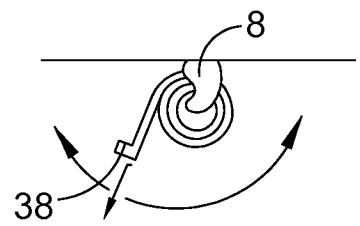
Figure 29:
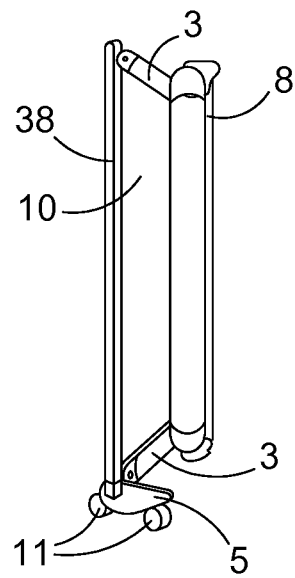
Figure 30A:
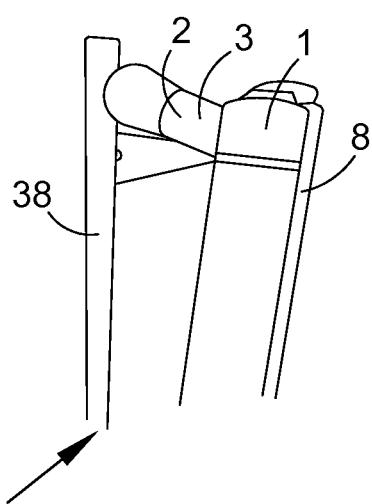

FIG. 12 shows the relationship between width, spacing and height of slats in the front face FIG. 13 shows the room-divider screen body casing empty, without the screen or handle FIG. 14 shows the room-divider screen with a casing and castors in its closed configuration FIG. 15 shows the room-divider screen with a casing and castors in its open and kinked configuration FIG. 16 shows the position of attaching to the central region of the convex side of the STEM FIG. 17 shows the structure when made from a fully slit rigid board FIGS. 18 A, B & C shows methods of attaching a STEM to the structure FIG. 19 shows the structure made from independent slats secured along the central line FIG. 20 shows a frame system where STEMs attach to supports and not directly to a slit board material FIGS. 21 A & B show how the rollable slit rigid board is created and show how the with the STEM on the back face forces the slits to bulge and open as the structure rolls up FIG. 22 shows the desired orientation of the STEM on the back face FIG. 23 shows a different rigid board construction where the outer sections are cut away revealing a flexible inner core that hinges FIG. 24 A, B, C show how the structure can be made more stable by preventing the STEMs from becoming straight, and adding supporting base features FIGS. 25 A & B shows a handle attached to the convex side of the leading end of a STEMs along its centre line FIG. 26 shows different profiles for the leading end of the STEM FIG. 27 shows how fastenings such as hook-and-loop can be used to help control the cylindrical structure of a system FIGS. 28 A & B show a configuration of the system with the STEM attached into a routed out section of the front face, when straight and when rolled up FIG. 29 shows the handle and handle base of a fixed-to-wall retractable screen without a casing FIG. 30A shows the handle when the handle is open and the STEM is straight.

Figure 30B:
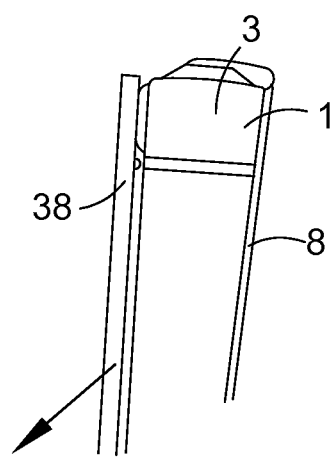

FIG. 30B shows the handle when the screen is closed, and the STEM is curved, and the handle is held close to the body.

Figure 31:
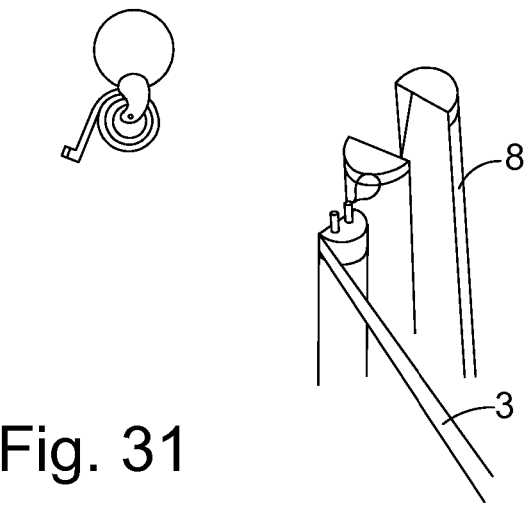

FIG. 31 shows another example system in which a handle is attached.

Figure 32A:
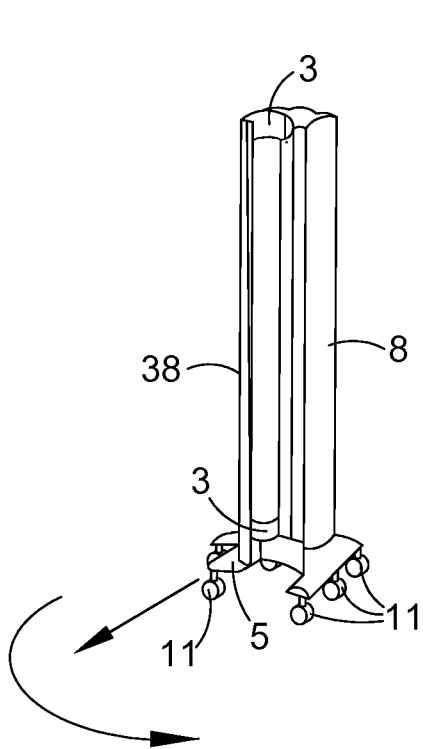
Figure 32B:
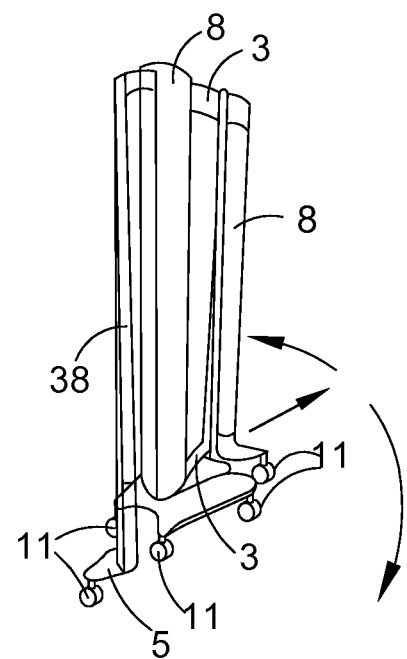

FIGS. 32 A & B show the example system with the handle attached as a front and rear views FIG. 33A shows a system with the handle attached, when both screens are extended FIG. 33B shows a system with both screens extended.

Figure 35:
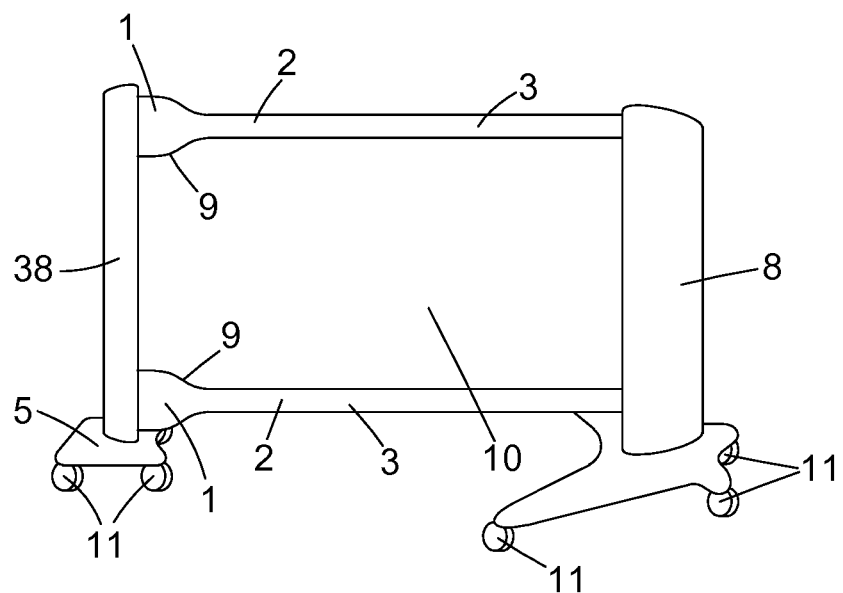
Figure 36A:
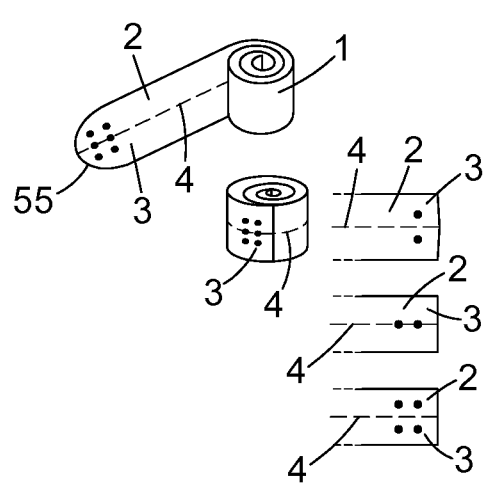
Figure 36B:
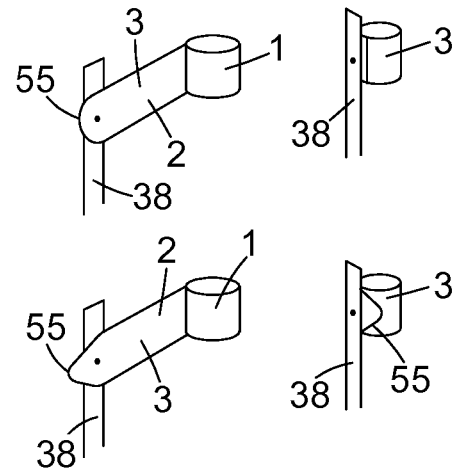
Figure 37:
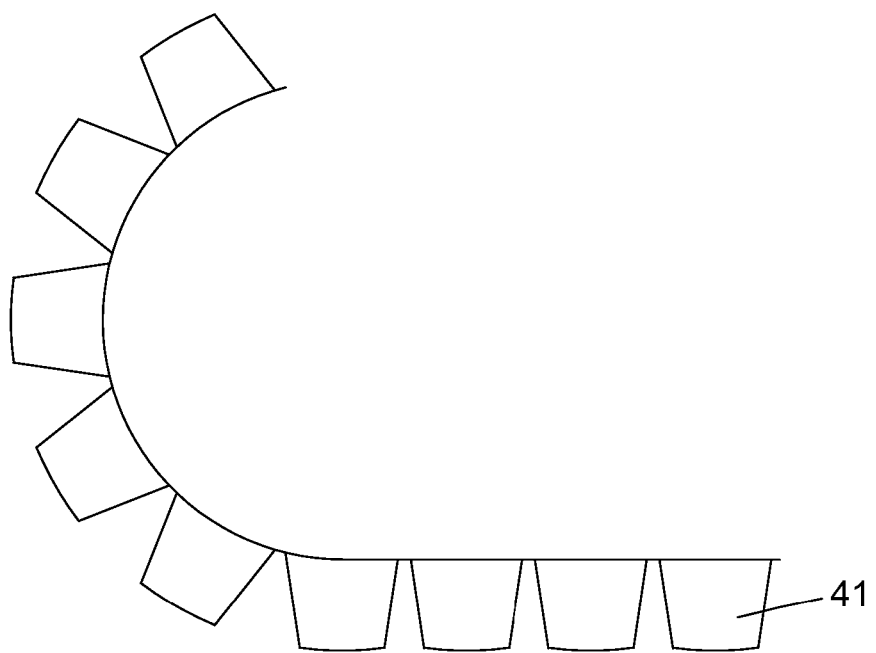

FIG. 34 shows the curvature of the STEM and how that creates a complex spline-shape to be cut out of an inner screen FIG. 35 shows how a clamp that holds a STEM flat creates a complex shape for an inner screen to fit into FIG. 36A shows various possible fixing locations symmetrically disposed around the axis for the STEM to handle FIG. 36B shoes a handle attached to a STEM with a straight leading edge and a chamfered leading edge, in both the open and closed configurations FIG. 37 shows the partially slit rigid board front and back faces In an example, STEMs 3 extending from a screen are attached to a vertical handle 38. The fixing is ideally by means of a single fastening through the centerline 4 or dispersed about the centerline 4 FIG. 36A, on the outside/convex of the STEM 3 such that it allows the STEM 3 to freely click open and shut FIGS. 25A and B, and FIG. 36B. The handle 38 of the system could then become a simple small aluminium extrusion or rod into which one fixing was used to secure each STEM 3 on the outside face FIGS. 30 A & B. Alternatively the handle 38 could be an extruded casing but which was connected to the STEM 3 by this simple means to create an arrangement that would look similar to that shown in FIG. 35, but where the edges of the STEMs 3 were always horizontal and where the section for the inner screen 10 was a simple rectangle. The simple handle 38 might be attached to a base plate 5 and thus a very slender minimal designed arrangement would be created FIG. 29. Incorporating this with a similarly simple body 8 with minimal exposed metal is shown in FIG. 29. A screen system can comprise two different systems which are attached at either the front handle 38 (as shown in FIG. 32), or the main body 8 (as shown in FIG. 33) of one of the systems, to create a doubled-up screen that can hinge in the middle. A 3 m×3 m corner can be created where the angle between the two screens can change FIG. 33B.

By changing the profile of the free end 55 of the STEM 3, FIG. 26, the force of the click shut can be modified. A curved cut might be more aesthetically pleasing, prevent sharp edges, and will also soften the force of closing and opening the end of the STEM 3. This free end 55 will be exposed and will change shape clicking shut and open. As such it may be desirable to coat this section of c-tube 3 with a rubberised coating, such as PlastiDip™ to both protect it from fraying and also give an improved aesthetic to the exposed leading edge 55, without interfering with its ability to undergo the complex shape change required.

The new clamping method allows the screen element of the arrangement to have a rectangular frame in which to sit, and thus eliminate the need for complex geometries 'splines' 9 to be cut out of the non-elastic material used to make the screen 10 as shown in in FIG. 35. This overcomes one of the problems identified in patent EP3251562 "Retractable screen". FIG. 34 shows the change in shape of the edge of a STEM 3 and how that requires a spline 9 to be cut into the screen material 10 to make it sit without unwanted forces. These unwanted forces are often still present as the shape of the spline 9 created under the STEM 3 changes as the STEM 3 is retracted. FIG. 35 shows the effect of this spline 9 shape on the screen 10.

FIG. 21A shows how a rigid board 41 can be partially cut on its front face 48 to allow it to roll up. This can be created either by partially cutting 42, 43 the full length with a knife or routing a groove 42,43 that penetrates partially through the material along the full length. Various possible shapes for routed profiles are discussed in FIGS. 11 and 12. If the board 41 is not made from a very rigid material (e.g. Felt board), it can be reinforced by being attached to a light and rigid backing structure, e.g. a honeycomb polypropylene structure. Alternatively, it could be supported by being attached to more rigid supports. These supports could be attached to the STEMs 3 and also to the board material 41 FIG. 20, as such that the board material 41 would not need to be attached to the STEMs 3.

FIG. 20 shows how the STEMs 3 can be attached to a small number of more robust slats or rods 40 that create a frame into which the other less robust slats 40 could fit. The advantage of this is that the slats 40 supporting the STEMs 3 could be much more robust as they are the providing the bulk of the structural support, and possibly attaching to castors 11. The structure inside the frame is only providing a visual barrier, and therefore can be much less substantial. This construction could be used to house the slit board construction 41 as shown in FIGS. 17, 43A and 43B. The supports 40 could be made of wood such as Venetian blinds, aluminium or PVC extrusions such as roller shutter panels. This method creates a frame into which various rollable inners could be inserted. An advantage of this for the slit board design, is that the board 41 would no longer need any full-depth cuts 43, as it would never be stretched outwards when rolling around the STEM 3, but instead could roll around the same plane and have the STEM 3 roll up either side of the material.

FIG. 22 shows the desired orientation of the STEM 3 on the back-face 47 that allows the slits 42, 43 to stretch and bulge open as they roll up. When securing a STEM 3 to the back-face 47, the back-face 47 will still have to stretch a little to allow it to roll around the STEM 3. If the STEM 3 were to be attached to the front-face 48, then the back-face 47 would have to stretch a lot more, as its radius of curvature would be increased by the thickness of the panel 41 as well as the STEM's 3 thickness. It is therefore normally necessary to fix the STEM 3 to the back-face 47, and to allow the back-face 47 to stretch a minimal amount as it rolls around the STEM 3. Some or all of the partial slits 42, 43 need to become full cuts 42, 43, penetrating through the panel 41 to allow the back-face 47 to expand 44—similar to how a Chinese lantern works when compressed FIG. 21B. The full-cuts 42, 43 are ideally at least the width of the flattened STEM 3 and could extend up to the full width of the board 41. The longer and closer together these full cuts 43 are the easier it will be to roll as the less the force will be exerted on them to bulge. If the full cuts 42, 43 are short, or non-existent then the slit board 41 would be hard to roll up and there would be a force in the system to unroll like a spring, to become flat given the opportunity. This feature is desirable if the structure is required to be rapidly deployed— e.g. when being used as an emergency privacy screen. In such an instance the coil could be held together with a fixing such as hook-and-loop Velcro 56, 57, which when removed allows the leading edge of the structure to be manually uncoiled, starting the then automatic further and full uncoiling/deployment of the structure. It might be desirable to have the STEM 3 attached to the front face 48 as this would provide a large flat unhindered back-face 47 onto which for instance a whiteboard or printed display could be attached. In such an instance the front face 48 might be routed out so that a channel 60 is created into which the STEM 3 could sit FIG. 28A, securing itself to the back of the back face 47, thus reducing the amount which the back face 47 would have to bulge in order to roll around the STEM 3 FIG. 28B. The other advantage of routing a channel 60 for the STEM 3 to be mounted into is that the roll diameter of the cylinder 1 will be kept to a minimum as the thickness of the STEM 3 will be hidden inside the channel 60 FIG. 28B.

The panel board 41 is ideally made from a material that is rigid when thick, but flexible when thin. In doing so a living hinge can be made by partially cutting it 42, 43. Preferably the outer faces 47, 48 of the board 41 are made from a more dense and substantial material than the inner core 49. This increases the second moment of area of the structure making it stiffer for a given weight, and also helps to create a hinge that is less likely to fail. E.g. foam board coated in plastic, a PET felt board that is semi rigid and has it's outer surfaces treated or laminated, or a wood veneer that once cut could roll up, cardboard with a honeycomb structure etc. One desirable material to use is PET felt board which also has the benefit of being sound absorbent, aesthetically pleasing, printable, easy to laminate and easy to machine and cut. There are many such materials available, such as Cube™, Symphony™ and Composition™ from Autex, or PolySorber—a Fire Resistant PET printable Acoustic Panel from Tech Materials. These acoustic panel sheets are self-supporting boards that can easily be cut 42, 43 and routed 60. These materials can be laminated to create layers that benefit the rolling up and rigid supports can be added and hidden in routed groves to create the ideal board construction. Another desirable material is PVC rigid or laminated board. The uncut back face 47/skin acts as a hinge when the front face 48/skin and core are cut 42, 43 or routed 60. One material that lends itself to this is Sealwise™. Sealwise is a homogeneous material with a foam core made of closed cell PVCU and a surface of solid PVC material.

Sealwise is non-toxic, Formaldehyde free, non-porous and can be used and processed using the same methods as panel products—yet offers better blade life. However, having similar characteristics, comparable density and weight to MDF, it can be processed using the same techniques. It can be machined, cut, CNC'd, routed, profiled and edged identically to MDF. It is 100% waterproof making it hygienic and suitable for tough environments internally and externally. Some materials are inherently 'fluted', such as corrugated cardboard, 'fluted polypropylene' CORREX™ and some wood laminates. These lend themselves to being partially slit 42, 43 along the grain to pierce the front face 48 (top layer of skin) and not the back face 47 (bottom layer of skin). The material then easily naturally hinges about the back face 47. Other materials that work well are honeycomb-cored cardboard and polypropylene structures where the back-face 47 provides the hinge, and the core and top layer 48 provide the structure. Alternatively, there are materials similar to the plastic cored Aluminium faced sheet, commonly known as Dibond®, but where Dibond has a rigid core, these materials have a flexible inner core 49, see FIG. 23. By routing away the Aluminium either side of this flexible core 49, a hinge can be created in the otherwise rigid material. FIG. 23 is a different construction, where the outer faces 47, 48 are rigid and the inner face 49 is flexible. By slitting the inner flexible core 49 in a fashion similar to that described in this patent, the hinged flexible Dibond material can be made to roll up and bulge unhindered around a STEM 3.

If cut 42, 43 and routed 60 in the methods described above and combined with supporting rods 23 and stable bases 5 as described in this patent, various interesting and useful roll-up structures could be created without needing STEMs 3 for support. To replace the function of the STEM 3 in the extended state 2, other methods of reinforcing the extended structure could be used, such as rigid or telescopic members being secured along the length. If however the structure is inherently rigid enough on its own, this might not be necessary. An advantage of not using STEMs 3, other than the cost saving, would be that the extended structure could flex into an 'S' shape, as STEMs 3 only kink 14 in one direction (like one's elbow). To replace the function of the STEM 3 in its coiled up state 1, other methods of securing the cylinder 8, 38 to remain closed could be used, such as magnets or hook and loop fastenings 56, 57 between the inner and outer faces of the rolled structure. A structure as described in this patent, using the same principles but without STEMs 3 is therefore possible.

Either the slatted 40 structure FIG. 19, or the slit board 41 structure FIG. 17/21 could create a reinforcement support framework for a rollable material 10 to be attached to the back-face 47. One example is a flexible dry-wipe writable surface which once stuck onto the back-face 47 would create a rollable whiteboard. Alternatively, a display could be fixed onto the back-face 47 to create a rollout display for exhibitions or advertising. The front-face 48 could be printed directly onto or could be coated in a stretchable fabric and the structure could be used as a flexible room partition. Flexible solar panels could be secured onto the back face to create deployable solar cells that for instance could be retracted during bad weather. Other technical applications are OLED flexible TVs and deployable antenna. The structure could be used to support concrete fabric such as Concrete Canvas™ and sprayed with water to create a concrete wall. Multiple structures could be attached together e.g. using zips/Velcro™/poppers etc. to create deployable structures for use in emergency shelters where large open pan rooms are often required to be reconfigured regularly to give privacy to the refugee inhabitants.

Figure 24A:
Figure 24B:
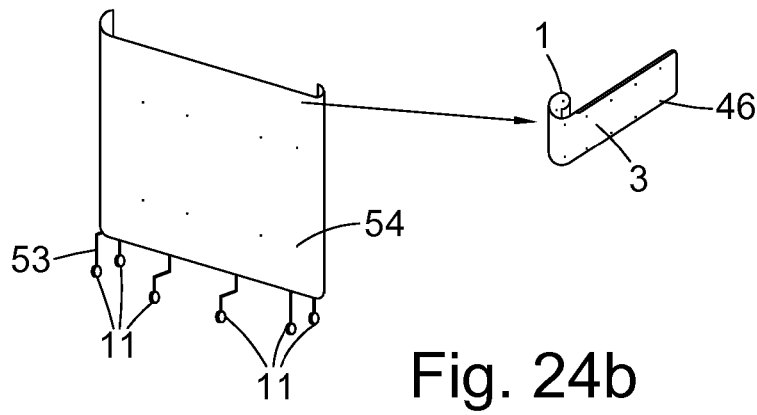
Figure 24C:
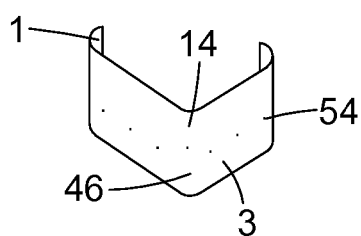

FIGS. 24A,B and C show how any of the STEM-structures mentioned in this patent can be made more stable by preventing the STEM 3 from becoming completely straight 51, FIG. 24A, along its full length, leaving the structure lying in one plane making it unstable and susceptible to falling over. If the STEM 3 is secured 54 to the structure along its centre line 4 then it is free to roll up 1 and unroll 2. If however the STEM 3 is secured 46 to the structure off its centre line 4, and ideally with two fixings 46 one well above and one well below the centre line 4, near to the edges of the STEM 3, then it cannot transform into the straight/extended orientation 2 and is forced to remain in the coiled orientation 1 (FIG. 24). If this is done at both ends then the structure will have a curved feature at both ends to provide some extra stability FIG. 24C. If done in the middle of the structure then it will form a kink 14 (FIG. 24C) at that point giving it even more stability FIG. 24C. By adding castors 11 and/or bases 5 to the supports 8, 38, a simple stable structure can be created FIG. 24B. Another way to help improve the stability of a STEM-structure is to make STEMs 3 that when retracted 2 are not straight but bowed. By altering the recipe of the STEM 3, it can be made to bow back on itself or in on itself. This banana shape where the STEM 3 is curved inwards or outwards would create a more stable structure but would also create more aesthetically pleasing screens such as for exhibition backdrops/booths where curved walls are often used.

In an embodiment a sheet of waterproof board material 41 such as fluted polypropylene, CORREX™ or Sealwise™, is partically slit on the outside-face every 1-10 cm. These slits 42, 43 go all the way through to the back-face only behind where the STEMs are attached. These full cuts 42, 43 can be at minimum the width of the STEM 3 (currently 150 mm) and maximum the full length of the flute (eg height of the board) but leaving a section that is not fully cut area at the top and bottom so that the structure doesn't completely separate into individual slats. The ideal CORREX™ material for this is about 5 mm-10 mm thick and the ideal Sealwise™ board is 3-6 mm thick. The STEM 3 is either sewn 45 along the centreline 4 or attached to the structure by means of mechanical fasteners or rivets every 5-50 cm. The structure is 1-3 m high, and 2-5 m wide. Two STEMs 3 are used, running along the width. Positioned 200-500 mm from the edge. The final structure is a lightweight, weatherproof, deployable wall which when printed can be used as an advertising banner e.g. for outdoor exhibitions, or can be used as an emergency privacy screen e.g. for emergency services. STEMs 3 are made of polypropylene, so this structure is completely recyclable except for the fixings which could be plastic. It is possible to apply a polypropylene felt layer to the CORREX™ during its manufacture thus creating a soft-finished version of the arrangement in a cost efficient manner. The structure could be coated with an aesthetic and acoustically performing fabric on both faces, as could the STEM 3, to create a soft furnishing, sound absorbing room partition in offices, private work areas etc. Extra functionality can be added by incorporating magnetic or dry wipe and or projection surfaces. The structure is lightweight and rigid and can therefore be lifted and fitted to castors 11, to make it more easily portable. Multiple of these systems can be attached to one another to create a continuous wall—by means of magnets, zips or Velcro along the leading edges as shown by elements 56, 57 in FIG. 27. Castors 11 can be fixed to the structure in a minimum number of places to allow for stability without needing to support the span of the structure, because that ability is inherent in the design of the structure that is self-supporting. Ideally the wheels 11 would go underneath the extremes of the curvature at the left and right ends as described in FIG. 24C, and another one or two would be off centre along the body 8 to prevent it from toppling backwards FIG. 24B. Without the castors 11 the structure has the advantage that it can be used either way round (upside down).

Another embodiment of any of the structures described, can be in a vertical/drop down orientation (e.g. a garage door), or pull up orientation (a vertical wall or OLED TV) or a pull out horizontal orientation (window awning/deployable acoustic roof). The drop down orientation screen could be used to create super-wide curtains, displays, sound baffling screens, that are ceiling mounted or that rise up from the floor. The awning structure could create self-supported blinds that require less infrastructure and are less likely to degrade due to the weather as they will inherently be a rigid structure instead of a tightly taught fabric (as is the case with standard super-wide awnings).

The structure could be further improved by the addition of a sprung core and a spinning bottom plate 35, FIG. 13 that is configured to support the system when wound on the spool 35, this would reduce the friction and assist in winding up FIG. 13. This would mean that the user would not have to manually unroll and roll up the structure, but instead could pull and push on a handle 38 which would unravel the structure. The handle 38 could be the section with the spool 35 in it, or it could be the loose end. The rotor core 38 could be assisted with a mechanical or an electrical spring.

It might be desirable to roll the structure in from both ends, thus creating two cylindrical rolls that meet in the middle. This might be because the Outer Diameter of the full cylinder might be too large for the STEMs 3 or because it is unwieldly to use. A structure could be created whereby the two cylinders meet along the same face (giving it a C-shape as shown in FIG. 24B). However if the STEM 3 were to be cut and turned around a structure where the cylinders meet back to back could be created, giving an S-shaped structure, which would be more stable as the ends would be curving in opposing directions. This also means that the structure could be kinked in both orientations as the top of the S bends in a different direction to the bottom. In any of the orientations mentioned above the structure could be designed so that the free ends can be attached to each other—thus creating a linked structure that can create a multitude of shapes, eg for reconfiguring a large open plan space into different flexibly designed zoned areas.

An embodiment is an acoustic felt board that is cut to create a roll up room divider—with added functionality of a white board, a projector surface, a pin board and/or hook and loop board. Or from the same design concept, using lower cost and weatherproof Correx™ fluted polypropylene or grooved Sealwise™ board any other rigid material that is similarly cut to create the outdoor, weatherproof partition structure.

If the full cuts 43 in the board material 41 were to extend the full length of the material then independent slats 40 would be created FIG. 17. A similar structure could be one where these slats 40 are not abutting each other but are spaced out, FIG. 19. The slats 40 shown in FIG. 19 are ideally lightweight and ridged, and thin, e.g. wood slats found in Venetian blinds. To add structure to the back of the slats 40 they could be attached onto a film material such as polyester film or an adhesive vinyl or felt. This would create a roll up mat. STEMs 3 (or another supporting material) can be added to this structure either continuously e.g. by sewing along the centre line 4 through the STEM 3 and into the slats 40 and or the backing film, or the STEMs 3 could be attached to the structure non-continuously such as rivets or eyelets spaced along the STEM 3 and connecting to some or all of the slats 40 FIG. 18. These various methods of attachment are also valid for the rigid board 41 method FIG. 17. The non-continuous methods such as eyelets, may require very few fixings but ideally at least one fixing every meter. The orientation of the slats 40, film, and STEM 3 is important, as the structure needs to allow the STEM 3 to roll up freely.

FIG. 4 shows a basic frame of two tubes 3 and a plurality of poles 22. In this embodiment, two or more tubes 3 can be connected to each other to achieve advantages as described above. The poles 22 comprise a resilient central section 24 and thinner flatter sections at each end (sticks 23) that interact with the split tubes 3. The sticks 23 can extend beyond the open face of the tube 3, or can be positioned to rest against one of the inside faces. A ladder-type structure for example can be constructed by extending two tubes 3 and then attaching rigid elements 22 perpendicular to them.

FIG. 5 shows different designs of low profile ends 23 with different design of holes. Rigid poles 24 can attach to tubes 3 directly or, to help reduce the impact on the OD of the tube 3, a low profile section called a flat stick 23 can be connected to the pole 24 that is wide enough to allow the tube 3 to flatten over its surface. There are various methods of connecting a pole 24 and a flat stick 23—some examples are shown in FIG. 5. The flat stick 23 can be any low profile shape however a flat face, generally rectangular in section—preferably a curved rectangular section so as to match the arc of the rolled up tube 2, is the most preferred profile to work with as the width of the stick 23 is of much less consequence to the OD than the thickness. See FIG. 6.

The flat stick 23 can be attached to the tube 3 in a number of ways. The preferred method is by means of an inelastic string or wire 21 (FIGS. 7, 8 and 9) that has a small diameter (such as fishing wire). This string 21 could simply wrap around the outside of the stick 23 and the tube 3 to secure the two together. This simple to assemble method would however provide limited support along the line of the pole 24 (i.e. the pole could slide out). Having four holes in each element through which to thread the wire 21 for attachment prevents the pole 24 from moving laterally, transversely and rotationally relative to the tube 3, and thus provides the most secure fitting.

The tightness by which the tube 3 is held against the stick 23 can be controlled by the positioning of the holes through which the wire 21 is threaded in the tube 3 and the stick 23, and this can create a pre-specified kinked shape.

FIGS. 8 & 9 show the mechanics behind the positioning of the holes in the tube 3 and flat stick (23).

FIG. 8 shows how the holes can be positioned to give a loose fitting when the tube is flat (rolled up) 1 and a tight fitting when the tube is curved (extended) 2.

FIG. 9 shows how the holes can be positioned to give a tight fitting when the tube is flat (rolled up) 1 and a loose fitting when the tube is curved (extended) 2.

Altering the position of the holes on the stick 23 and or the tube 3 can adjust this effect, creating a mixture of the two to achieve the desired effect for the specific application.

Other forms of attachment include adhesion or mechanical fixing of one edge of the split tube 3 to the stick 23, wrapping fabric around the stick 23 and the tube 3, attaching flaps with hinged eyelets 25 to the edges of the tube 3 through which a stick 23 could be inserted—these hinged eyelets 25 could simply be loops of thread similar to a button fastening on the back of a dress. See FIG. 10 illustrating button loops 25 on the edge of split tube 3.

The following is a list of the reference numerals shown in the drawings.
1. rolled up tube
2. extended tube
3. split tube STEM
4. centre line of split tube
5. base plate
8. body
9. spline-cut out in inner panel
10. inner panel
11. castor wheel
14. Kink in split tube
20. pole
21. Inelastic string or wire
22. pole
23. stick
24. resilient central section
25. Button Loops
35. thrust bearing spinning disc
36. casing of the body retaining the rolled up material screen
37. smooth protective surface
38. front handle of the system
40. Rigid slats
41. Solid board material
42. Partial slit cuts
43. Full through slit cuts
44. bulging slits effect
45. sew thread along Centre line of STEM
46. holes for fixtures
47. Back face
48. Front face
49. Flexible inner core
51. Flat material
52. Rolled up material
53. Foot extension
54. Holes for fixtures on Centre line of STEM
55. Leading edge of STEM
56. Velcro hook
57. Velcro loop
58. V-cuts open for flat
59. V-cuts closed for curvature
60. Routed feature to house STEM

The invention claimed is:

1. A Split Tube Extendable Member (STEM) system comprising:
at least one coilable STEM that has a central axis and that is capable of being extended along an axis by uncoiling the STEM and of being retracted back along the same axis by coiling the STEM, wherein the STEM has an end that forms the leading end of the STEM when it is uncoiled, and wherein the STEM, when extended/uncoiled, has a concave side and a convex side; and
a handle that is attached to the convex side of the leading end of the at least one STEM by one or more connections, whereby the coiling action of the leading end of the STEM when retracted biases the handle towards the rest of the coiled STEM and extending away from the coiled STEM.

2. The Split Tube Extendable Member (STEM) system as claimed in claim 1, wherein the handle engages the ground when the at least one coilable STEM has been extended and thereby supports the leading end of the STEM.

3. The Split Tube Extendable Member (STEM) system as claimed in claim 2, wherein the handle is supported on at least one castor or glider foot.

4. The Split Tube Extendable Member (STEM) system as claimed in claim 1, wherein connections attaching the handle to the convex side of the leading end of the at least one STEM lie on or adjacent to the central axis of the STEM.

5. The Split Tube Extendable Member (STEM) system as claimed in claim 1, wherein the leading end of the at least one coilable STEM is clamped flat against the handle.

6. The Split Tube Extendable Member (STEM) system as claimed in claim 1, wherein the STEM, when extended has a width of 50 mm to 100 mm and subtends arc of between 100 and 180 degrees.

7. The Split Tube Extendable Member (STEM) system as claimed in claim 1, which includes a housing for holding the coiled portion of the at least one coilable STEM.

8. The Split Tube Extendable Member (STEM) system as claimed in claim 7, wherein the housing engages the ground, and optionally includes at least one castor or gliding feet.

9. The Split Tube Extendable Member (STEM) system as claimed in claim 1, which includes a screen attached to the at least one STEM by an attachment that allows the at least one STEM and the screen to be coiled and uncoiled together.

10. The Split Tube Extendable Member (STEM) system as claimed in claim 9, which includes a support that is configured to support the structure in its unrolled configuration and comprises at least two STEMs that are spaced apart from each other and are extendible along parallel axes and wherein the screen is supported along opposed edges by said at least two STEMs.

11. The Split Tube Extendable Member (STEM) system as claimed in claim 10, wherein the handle, the at least two STEMs and the housing form a rectangular frame supporting the screen.

12. The Split Tube Extendable Member (STEM) system as claimed in claim 1, wherein the at least one STEM is mounted on a spool.

13. The Split Tube Extendable Member (STEM) system as claimed in claim 12 wherein the spool is biased by a spring that is configured to assist in the retraction of the screen.

14. The Split Tube Extendable Member (STEM) system as claimed in claim 1, wherein the leading end of the at least one STEM is attached directly to the handle at a single point by adhesive or a mechanical fixing comprising stitching, welding, adhesive, a rivet or an eyelet, optionally the adhesive or the mechanical fixing is used in combination with a bolt.

15. The Split Tube Extendable Member (STEM) system as claimed in claim 1, wherein the leading end of the at least one STEM is curved or angled/chamfered in shape and is not orthogonal to the STEM central axis.

16. The Split Tube Extendable Member (STEM) system as claimed in claim 1, which includes a clamp that clamps the at least one STEM part of the way along its length and prevents the STEM from forming said concave and convex sides in the region of the clamp, which causes the STEM to kink in the region of the clamp.

17. The system as claimed in claim 1 that is in the form of a temporary or permanent indoor or outdoor screen, a room divider, an exhibition screen, a safety screen for lasers or x-rays or welding, a door, such as a drop down door, a garage door, a window awning, a curtain or blind, a sound baffling screen, a portable partition screen, a screen in an MM scanning room when the whole system is non-ferrous, and can optionally function as a whiteboard, a blackboard, a projection surface, a pin board and/or hook and loop board, a poster, a mirror, a solar array, a mirrored film surface, a satellite dish, a decorative panel, a photovoltaic solar array, a flexible television or monitor, an OLEO TV, an LED light or as the support structure to which other materials can be attached, to provide the claimed functionalities.

18. The system as claimed in claim 1 wherein the at least one STEM is configured to be uncoiled horizontally, upwards or downwards, including obliquely upwards or downwards or curved inwards or curved backwards.

\* \* \* \* \*